Patented Apr. 30, 1940

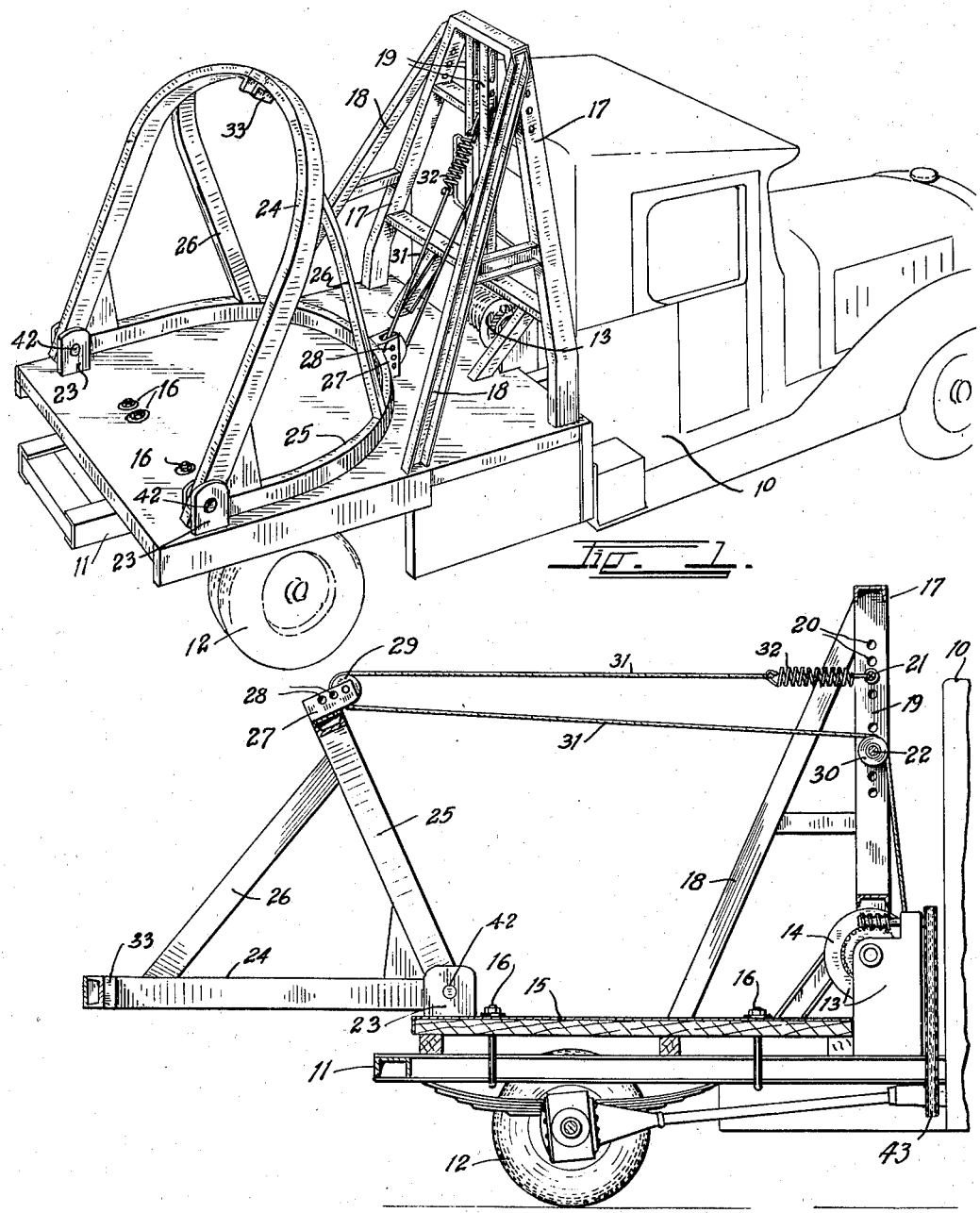

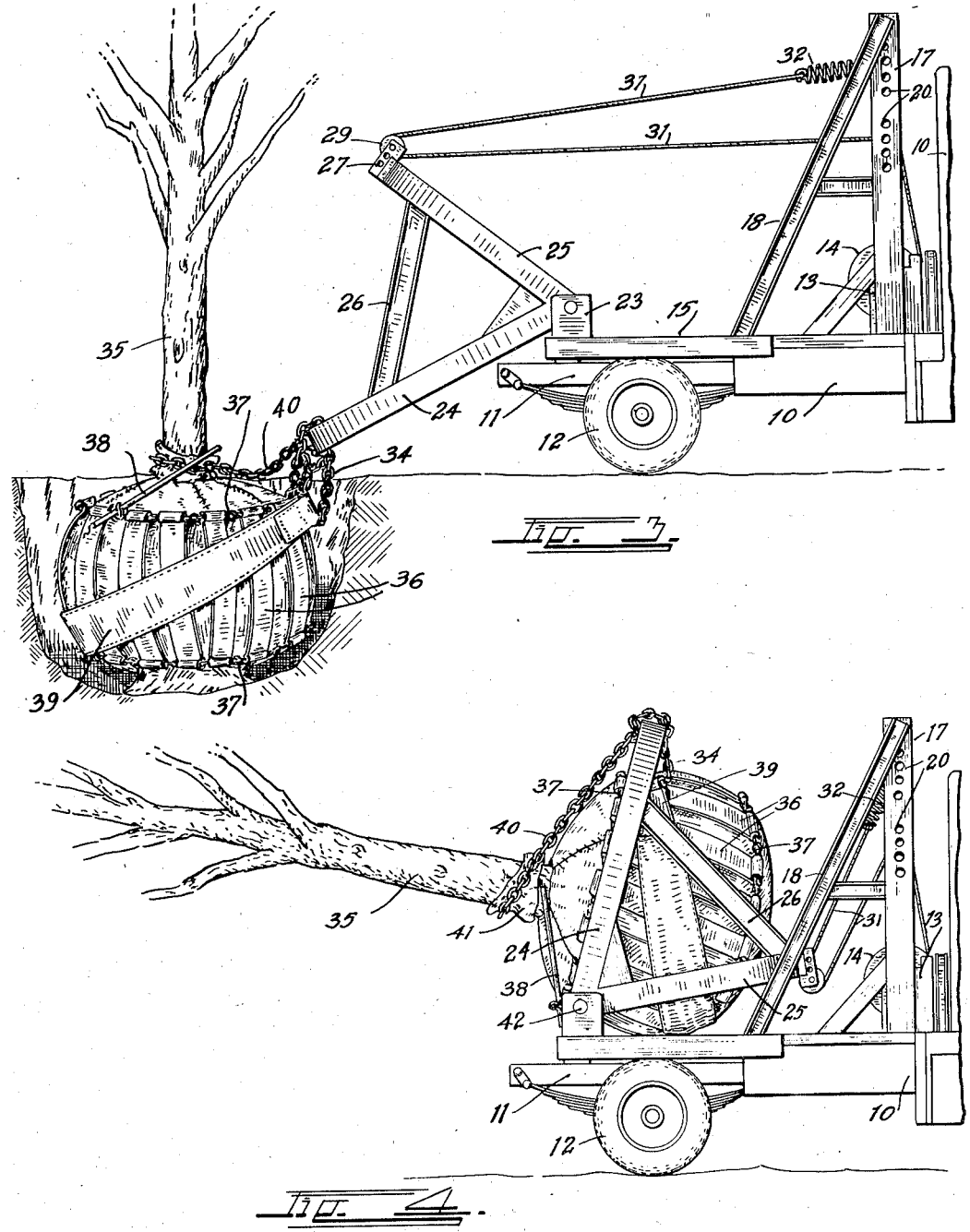

2,198,690

UNITED STATES PATENT OFFICE 2,198,690

TREE TRANSPORTING AND TRANSPLANTING DEVICE

Charles C. Wilmore, Wheatridge, Colo.

Application June 27, 1938, Serial No. 216,152

11 Claims. (Cl. 214—3)

This invention relates to an improvement in means for transporting and transplanting trees.

The principal object of the invention is to provide a highly efficient mechanism which will lift a tree and its attached ball of earth, from place, transport it to a new location, and set it in the hole prepared to receive it with a minimum of labor and time and without damage to the tree.

Another object is to remove the necessity for the employment of derricks and rigging at the point of removal and at the point of planting.

Still another object of the invention is to provide means for attaching to and supporting the ball of earth around the roots of the tree during transportation.

A further object is to provide a motor truck with means for lifting a tree from the ground; placing it upon the truck; supporting it during transportation; and lifting it from the truck to the ground.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view of a motor truck equipped with the improved tree transporting device.

Fig. 2 is a longitudinal section through the tree lifting portion thereof with the double yoke member in the extended position.

Fig. 3 illustrates the truck in position for lifting a tree and its attached ball of earth from place.

Fig. 4 illustrates the tree in position over the truck ready for lowering into its final resting place.

In the drawings a typical motor truck is indicated at 10 with its chassis at 11 and its rear drive wheels at 12. The truck may be of any desired type. It is preferably one of the standard hoist trucks which are equipped with a winch 13 having a cable drum 14 driven by means of a drive chain 43 from the motor and transmission of the truck. Trucks of this nature are standard and available upon the market.

The improved tree lifting and transporting mechanism consists of a platform 15 which is attached to and supported on the truck chassis 11 in any desired manner such as by means of U-bolts 16 which clamp the platform to the chassis.

A stationary frame 17 is erected adjacent the forward extremity of the platform and braced by means of suitable brace beams 18. The frame 17 carries two vertical parallel bars 19 on its vertical center line. These bars are formed with a vertical series of aligned holes 20 through which a cable attachment bolt 21 and a sheave axle 22 can be passed.

The platform is also provided with pivot bearing posts 23 for receiving pivot pins 42 which pivotally support a double yoke member consisting of a rear inverted-U-shaped yoke bar 24 and a similar forward yoke bar 25. The two yoke bars 24 and 25 are permanently attached together to form a complete V-shaped unit and are braced from each other by means of suitable cross braces 26 so as to be rigidly maintained at a pre-set angle. It has been found that an angle of approximately 70° is satisfactory. In any event, this angle should be something less than 90°.

The forward yoke bar 25 is provided with a pair of parallel sheave plates 27 which are formed with a series of holes 28 for adjustably receiving the bearing shaft of a first sheave wheel 29. A second sheave wheel 30 is mounted on the axle 22 of the frame 17.

A cable 31 is passed from the cable drum 14 over the sheave 30 thence around the sheave 29 to a tension spring 32 which is in turn attached to the cable attachment bolt 21.

The rear yoke bar 24 carries a pair of short angle bars 33 which act to hold a tree attachment chain 34 at the apex point of the yoke bar.

A typical tree is indicated at 35. In use a circular hole is dug into the earth around the tree 35, as shown in Fig. 3. This hole is continued as far as possible beneath the tree to outline a ball of earth around the roots of the tree.

A series of clamping bands 36 are now passed into the hole. These bands are joined together at their tops and bottoms by means of encircling cables or chains 37. The encircling cables or chains are drawn taut in any suitable manner, such as by twisting them by means of a crow bar 38. A relatively wide lifting band 39 is now pressed into the hole as far as possible on the far side of the tree and passed around the earth ball on a diagonal, as shown in Fig. 3. The extremities of the lifting band 39 are tied together and to the rear yoke bar 24 by means of the lifting chain 34. A guide chain 40 is then passed from the rear yoke bar about the trunk of the tree 35, suitable padding 41 being used to prevent injury to the tree. The entire ball of earth is preferably wrapped with suitable burlap to prevent loss of earth before the attachment of the clamping bands 36 and 39.

The truck motor is now started and the cable drum 14 is rotated to reel in the cable 31. This acts to draw the forward yoke bar 25 forwardly causing it to exert a lifting action on the rear bar 24. The latter, due to the point of attachment of the lifting band 39, simultaneously lifts and tilts the ball of earth and tree rearwardly to break the remaining roots and earth from the ball. This bending or tilting action on the tree is very important to make the final break from place.

The reeling of the cable continues until the rear yoke bar passes the vertical position. The weight of the tree and earth then swings the earth ball forwardly causing the forward yoke bar to drop toward the platform 15. This drop is cushioned by means of the tension spring 32, as shown in Fig. 4, to prevent damage to the truck or earth ball. The cable reel is now reversed to lower the rear bar 25 and allow the entire weight of the ball to come to rest upon the platform 15. It being maintained in the proper position thereon by means of the chains 34 and 40, as shown in Fig. 4. It will be noted that the ball is entirely surrounded by the double yoke structure and tied by the chains so that it cannot roll or fall from place during transportation.

When the planting hole is reached, the above described operation is reversed. The cable reel 14 is started to reel in the cable. This lifts the forward yoke bar 25 until the rear yoke bar passes the vertical position. This allows the weight of the tree and earth ball to swing the double yoke outwardly and downwardly, its swing being stopped and cushioned by means of the cable 31 and the spring 32. The reel is now reversed to unreel the cable until the earth ball rests in the hole which has been prepared for it.

While the invention has been described as particularly applicable for use in transporting and transplanting trees, it is, of course, not limited to this particular function but will be found valuable wherever it is desired to lift any heavy object and place it upon a truck for transportation and the claims should be so construed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A tree transportation device comprising: a vehicle; a double, inverted-U-shaped yoke member, said yoke member consisting of two arched bars secured together adjacent their lower extremities; pivot means for pivoting the latter extremities to said vehicle; means for maintaining said bars at a fixed angle from each other; cable reeling means on said vehicle; and means for attaching said bars to said cable reeling means so that as the forward bar is pulled forwardly by said cable reeling means, the rearward bar will be lifted vertically.

2. A tree transportation device comprising: a vehicle; a double, inverted-U-shaped yoke member, said yoke member consisting of two arched bars secured together adjacent their lower extremities; pivot means for pivoting the latter extremities to said vehicle; means for maintaining said bars at a fixed angle from each other; cable reeling means on said vehicle; means for attaching said bars to said cable reeling means so that as the forward bar is pulled forwardly by said cable reeling means, the rearward bar will be lifted vertically; and flexible means attached to the rear yoke bar for surrounding the earth ball of a tree.

3. Means for lifting and transporting a tree and its attached earth ball comprising: a vehicle; a first frame arising from said vehicle; pivot supports at each side of said vehicle rearwardly of said fixed frame; a forward, inverted-U-shaped yoke bar extending from one pivot support to the other; a similar rearward yoke bar also extending from one pivot support to the other; means for maintaining said yoke bars at a fixed angle from each other; cable reeling means on said vehicle; a sheave wheel supported by said fixed frame; and a cable extending from said cable reeling means over said sheave wheel to one of said yoke bars so that both yoke bars will be swung forwardly about the pivot supports as the cable reeling means is operated.

4. Means for lifting and transporting a tree and its attached earth ball comprising: a vehicle; a first frame arising from said vehicle; pivot supports at each side of said vehicle rearwardly of said fixed frame; a forward, inverted-U-shaped yoke bar extending from one pivot support to the other; a similar rearward yoke bar also extending from one pivot support to the other; means for maintaining said yoke bars at a fixed angle from each other; cable reeling means on said vehicle; a sheave wheel supported by said fixed frame; and a cable extending from said cable reeling means over said sheave wheel to one of said yoke bars so that both yoke bars will be swung forwardly about the pivot supports as the cable reeling means is operated, the angle between said two yoke bars being less than 90° so that when the forward yoke bar reaches the horizontal position, the rear yoke bar will extend forwardly of the pivot supports.

5. Means for lifting and transporting a tree and its attached earth ball comprising: a vehicle; a first frame arising from said vehicle; pivot supports at each side of said vehicle rearwardly of said fixed frame; a forward, inverted-U-shaped yoke bar extending from one pivot support to the other; a similar rearward yoke bar also extending from one pivot support to the other; means for maintaining said yoke bars at a fixed angle from each other; cable reeling means on said vehicle; a sheave wheel supported by said fixed frame; a cable extending from said cable reeling means over said sheave wheel to one of said yoke bars so that both yoke bars will be swung forwardly about the pivot supports as the cable reeling means is operated, the angle between said two yoke bars being less than 90° so that when the forward yoke bar reaches the horizontal position, the rear yoke bar will extend forwardly of the pivot supports; and means for attaching the rear yoke bar to a tree ball.

6. Means for lifting and transporting a tree and its attached earth ball comprising: a vehicle; a first frame arising from said vehicle; pivot supports at each side of said vehicle rearwardly of said fixed frame; a forward, inverted-U-shaped yoke bar extending from one pivot support to the other; a similar rearward yoke bar also extending from one pivot support to the other; means for maintaining said yoke bars at a fixed angle from each other; cable reeling means on said vehicle; a sheave wheel supported by said fixed frame; a cable extending from said cable reeling means over said sheave wheel to one of said yoke bars so that both yoke bars will be swung forwardly about the pivot supports as the cable reeling means is operated, the angle between said two yoke bars being less than 90° so that when the forward yoke bar reaches the horizontal position, the rear yoke bar will extend forwardly of the pivot supports; a relatively wide flexible band for surrounding said earth ball; and means for securing said band to the rear yoke bar.

7. Means for lifting and transporting a tree and its attached earth ball comprising: a vehicle; a first frame arising from said vehicle; pivot supports at each side of said vehicle rearwardly of said fixed frame; a forward, inverted-U-shaped yoke bar extending from one pivot support to the other; a similar rearward yoke bar also extending from one pivot support to the other; means for maintaining said yoke bars at a fixed angle from each other; cable reeling means on said vehicle; a sheave wheel supported by said fixed frame; a second sheave wheel mounted on the forward yoke bar; and a cable extending from said cable reeling means over the sheave wheel on the first frame about the second sheave wheel thence returning to a connection on said first frame.

8. Means for lifting and transporting a tree and its attached earth ball comprising: a vehicle; a first frame arising from said vehicle; pivot supports at each side of said vehicle rearwardly of said fixed frame; a forward, inverted-U-shaped yoke bar extending from one pivot support to the other; a similar rearward yoke bar also extending from one pivot support to the other; means for maintaining said yoke bars at a fixed angle from each other; cable reeling means on said vehicle; a sheave wheel supported by said fixed frame; a second sheave wheel mounted on the forward yoke bar; a cable extending from said cable reeling means over the sheave wheel on the first frame about the second sheave wheel thence returning to a connection on said first frame; and a spring interposed between the latter extremity of said cable and said fixed frame.

9. A tree transportation device comprising: a vehicle; an inverted-U-shaped yoke member, consisting of two U-shaped yoke bars secured together adjacent their lower extremities to form a V-shaped unit; cross braces extending between said bars to rigidly maintain them at a pre-set angle from each other; pivot means for pivoting the lower extremities of said bars at the rear of said vehicle; reeling means; and flexible means extending from said reeling means to said yoke member so that the latter may be drawn forwardly on said vehicle about its pivot points.

10. A tree transportation device comprising: a vehicle; an inverted-U-shaped yoke member, consisting of two U-shaped bars secured together adjacent their lower extremities to form a complete V-shaped unit; cross braces extending between said bars to rigidly maintain them at a pre-set angle from each other; pivot means for pivoting the lower extremities of said bars at the rear of said vehicle; reeling means; flexible means extending from said reeling means to said yoke member so that the latter may be drawn forwardly and rearwardly on said vehicle about its pivot points; a spring secured to said flexible means for cushioning the forward and rearward movements of said U-shaped yoke member; and means for attaching a tree ball to said yoke member.

11. A tree transportation device comprising: a vehicle; a first frame arising from said vehicle; pivot supports at each side of said vehicle rearwardly of said fixed frame; a forward inverted U-shaped yoke bar extending from one pivot support to the other; a similar rearward yoke bar also extending from one pivot support to the other; cross braces extending between said yoke bars to maintain them at a fixed angle of less than 90° from each other; reeling means on said vehicle; a sheave wheel supported by said fixed frame; a second sheave wheel mounted on the forward yoke bar; flexible means extending from the reeling means over the sheave wheel on the first frame about the second sheave wheel mounted on the forward yoke bar thence returning to a connection on said first frame; a spring interposed between the latter extremity of said cable and said fixed frame; a flexible band for surrounding an earth ball; and means for securing said band to the rear yoke bar.

CHARLES C. WILMORE.